UNITED STATES PATENT OFFICE.

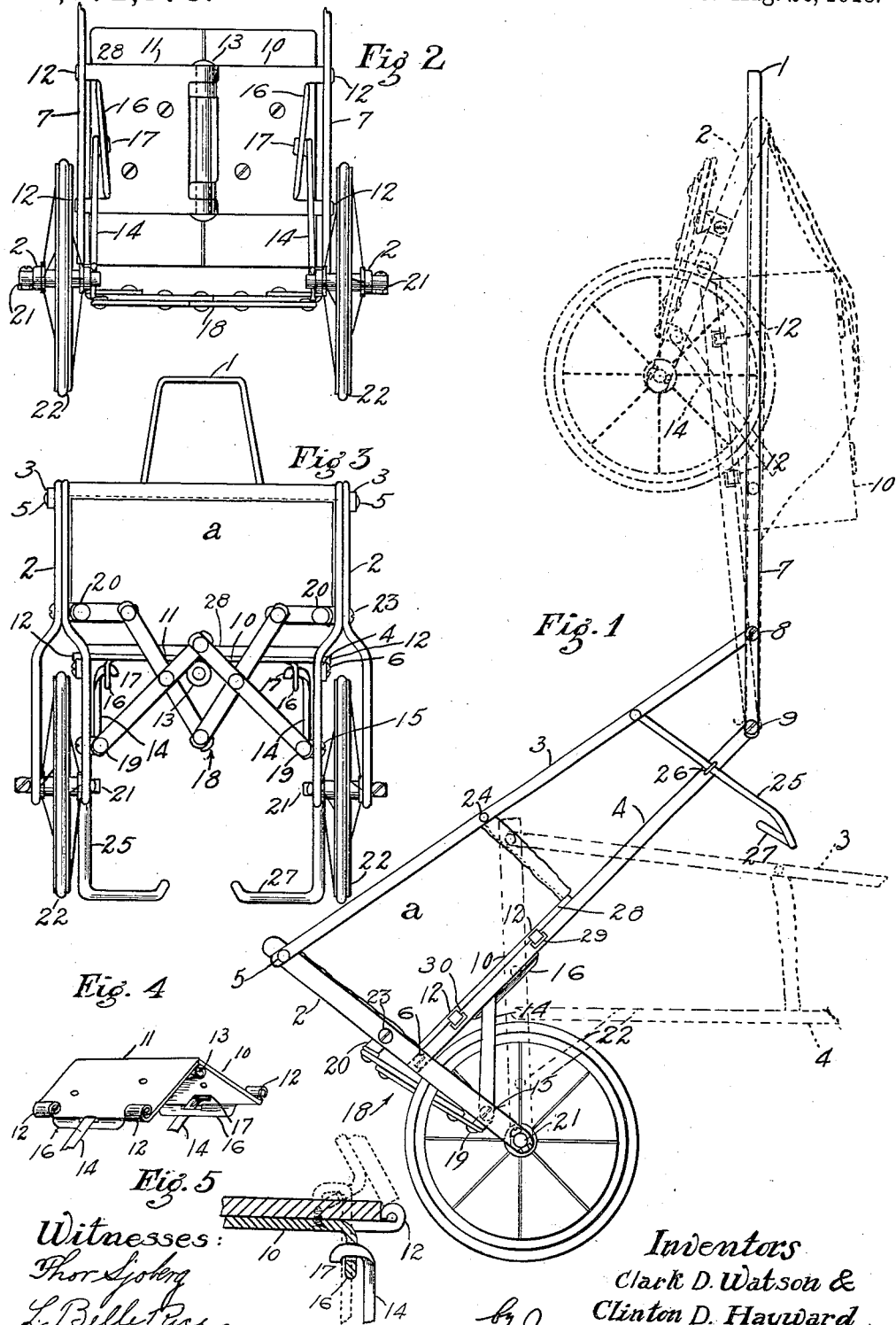

CLARKE D. WATSON AND CLINTON D. HAYWARD, OF LOS ANGELES, CALIFORNIA, ASSIGNORS TO KUNS, HAYWARD, WATSON CO., OF LOS ANGELES, CALIFORNIA, A CORPORATION OF CALIFORNIA.

COLLAPSIBLE GO-CART.

1,071,376.  Specification of Letters Patent.  Patented Aug. 26, 1913.

Application filed June 17, 1912. Serial No. 704,231.

*To all whom it may concern:*

Be it known that we, CLARKE D. WATSON and CLINTON D. HAYWARD, both citizens of the United States, residing at Los Angeles, in the county of Los Angeles and State of California, have invented a new and useful Collapsible Go-Cart, of which the following is a specification.

An object of this invention is to provide a go-cart which can be collapsed into minimum space with maximum ease and convenience.

An object of the invention is to so construct the cart that the operations of expanding and collapsing the same may be performed by the use of one hand and practically with one motion to collapse and the opposite motion to expand.

The invention is applicable in various ways in go-carts of various kinds and comprises two side-bars; standards in pivotal relation to the side bars; seat leaves hinged to each other and to the side bars; a handle in pivotal relation to the side bars; means connecting the handle to the standard to oscillate the standard relative to the side bars; and means connecting the standards with the seat leaves to oscillate the leaves as the standards oscillate on the side bars, thus to collapse and expand the go-cart as the handle oscillates.

The standards are supplied with antifriction runners which may be of any practical form and arrangement as sled runners or cart wheels and when the runners stand upon a support and the seat is occupied, the weight of the occupant holds the go-cart expanded in a manner well-known in the art.

The invention comprises the go-cart and the novel parts and combination of parts set forth in the subjoined detail description.

The accompanying drawings illustrate the invention.

Figure 1 is a side elevation of the cart as it appears at the close of the expanding operation. Dotted lines at the top of the view indicate the collapsed position and dotted lines at the bottom of the view indicate the extended position of the go-cart in use. Fig. 2 is a view looking at the bottom of the cart expanded. Fig. 3 is a rear elevation of the cart. Fig. 4 is a detail of the collapsible seat and the collapsible links to illustrate the action of the collapsing links upon the seat leaves. Fig. 5 is a fragmental sectional detail of the seat and link. Dotted lines indicate the collapsing movement.

The handle 1 by which the cart is carried and manipulated is a loop of strap iron or other suitable material. The opposite sides of the cart are frames of the same general construction, each comprising a wheel standard 2, a top bar 3 and a bottom bar 4, said bars being pivoted by pivots 5, 6 to the wheel standard 2; and a limb 7 of the loop handle 1 which is pivoted by pivots 8, 9 to the front ends of the top and bottom bars, respectively, so that when the handle or the wheel standard is moved on the pivots the side frame changes shape toward or from collapsing position. The bottom bars of the two side frames are connected by two seat sections 10, 11 in the form of leaves hinged at 12 to the bottom bars respectively and hinged together by the hinge 13 midway between the bottom bars.

Collapsing and bracing links 14 are pivoted by pivots 15 to the wheel standards below the bottom bars and extend upward therefrom to sliding engagement with the guides 16 at the hinged edges of the seat sections, each link being provided at its free end with an oblique hook portion 17 to contact with the underside of its seat-leaf or section to force such section upward into collapsed position as the form of the side frames change during the collapsing action.

A lazy tongs connecting brace 18 extends between the wheel standards 2 and is pivoted by the bottom and top pivots 19, 20, to such standards to hold the standards in true relation at all times so that the axes 21 of the wheels 22 will always be in line with each other. The wheel standards are preferably each constructed of two pieces of strap iron or other suitable material fastened together by the pivots 5 and the bolts 23.

The loop handle is a bail made of strap iron and yields sufficiently to accommodate the lateral separation and approach of the sides during expansion and collapse of the go-cart body. The bail or handle 7 is of greater length than the sides of the go-cart, so that when the go-cart is collapsed the sides may be accommodated between the side limbs 7, thus leaving the bight of the loop or bail free to be held by the hand. When the handle is collapsed the side limbs 7 of the handle engage the rear ends of the side frames with sufficient force to hold the go-cart in collapsed position under ordinary handling.

When it is desired to expand the go-cart the person having hold of the handle will give the go-cart a sudden jerk, first downward and then upward, thereby causing the weight of the rear end of the go-cart with its standards, wheels and lazy tong brace to pull the side frames loose from the loop handle and to swing down from the handle and as the rear end of the frames descend, the leverage between the top and bottom bars, the wheel standards and the handle, operate the links in the guides to pull down the guides and their seat sections, thereby bringing the seat sections into extended position. The joint between the sections is a knuckle joint, thus to hold the seat from bending down below horizontal position.

To collapse the go-cart the person having hold of the handle will tilt the go-cart, so that it rests on one wheel only, leaving the other wheel to move laterally as the collapsing operation occurs. Then the handle loop will be moved up over backward and down until the top bars of the sides are again received between the side limbs 7 of the handle, whereupon the go-cart is fully collapsed and ready to be picked up by the bail 1 and carried and manipulated thereby.

The body of the go-cart may be provided with a sheet $a$ of strong flexible material fastened by rivets 24 and 5 to the top bars 3, and formed to supply a seat bottom, back and sides; and the same collapses and expands with the other parts of the go-cart.

Combined foot rests and cart legs 25 are pivotally connected to the top side-bars 3 and extend down through eyes 26, forming guides therefor on the bottom side-bars 4, so that said legs are in sliding and pivotal relation to said bottom bars and serve as foot rests and as cart supports and do not interfere with the collapsing and expanding operations. The lower ends of the legs are bent inward to form the foot pieces 27.

The leaves 10 and 11 shown in the drawings are metal plates slit slotted and bent to form the guides 16 and the knuckles for the hinges and are faced with wood or other suitable material as indicated at 28.

The bottom side bars 4 are provided with slots 29 to receive the hinge knuckles 12 that are bent up from the seat leaves 10, 11 to extend around the portions 30 of the bars 4 above said slots 29; said portions forming axes for the seat hinges at right angles to the pivots of the standards so that when the standards are oscillated on their pivots by means of the handle and the side bars the links cause the leaves to oscillate laterally relative to the standards.

We claim:—

1. A go-cart comprising a bail and having two sides each comprising a wheel standard, a top bar and a bottom bar, the top and bottom bars being pivotally connected at their rear ends to the wheel standards and at their front ends to the limbs of the bail; seat members hinged to each other and to the bottom bars; guides on the seat members; and links pivotally connected to the standards and working in the guides to move the seat members on their hinges.

2. A collapsible go-cart comprising side bars; a seat formed of two leaves hinged together and hinged to the side bars: a bail pivoted to the side bars to relatively oscillate them; and means operatable by the side bars to move the leaves as the side bars are oscillated.

3. In a go-cart the combination with a side bar; of a seat leaf hinged thereto; a standard pivoted to the side bar; a link in pivotal relation to the standard and in slidable engagement with the leaf to swing the leaf as the bar moves relative to the standard.

4. A go-cart comprising standards; a lazy-tongs brace pivotally connected to the standards to hold them in true relation to each other; bottom side bars pivoted to the standards; seat leaves hinged to the side bars and to each other; a bail pivoted to the bottom side bars; means operatively connecting the bail and the standards to oscillate the standard as the bail oscillates; and means connecting the standards with the seat leaves to oscillate the leaves as the standard oscillates.

5. In a collapsible go-cart top and bottom side-bars; standards pivotally connecting the bottom side bars with the top side bars; seat leaves hinged to the side bars and to each other; guides on the seat leaves; links pivoted to the standards and working in the guides to move the seat leaves on their hinges; a handle pivotally connecting the bottom side bars with the top side bars to oscillate the same, and legs pivoted to the top bars and slidably connected to the bottom bars.

6. In a go-cart the combination with a standard and side bar; of a leaf hinged to the side bar; a guide on the under side of the leaf; and a link pivoted to the standard and engaging the guide to oscillate the leaf as the standard moves on its pivot.

7. The combination with a hinged seat leaf, of a guide extending down therefrom, a standard in pivotal relation to such leaf and a link in operative relation to the standard and guide to move the leaf on its hinge as the standard oscillates relative to the leaf.

8. The combination with the hinged seat leaf of a slotted guide and a link working in the guide and provided with an oblique hook to engage the guide to move the leaf on its hinge.

9. The combination with the hinged seat leaf of a slotted guide and a link working in the guide and provided with an oblique hook to engage the guide to move the leaf on its hinge, and a standard in pivotal relation to the leaf and pivoted to the link to move the leaf as the standard oscillates.

10. In a collapsible go-cart the combination with two top and two bottom side bars; of a seat formed of leaves hinged to the bottom side bars and to each other; and a supporter consisting of a sheet of flexible material fastened to the two top side bars.

11. In a collapsible go-cart the combination with two top and two bottom side bars; of a seat formed of leaves hinged to the bottom side bars and to each other; and a supporter consisting of a sheet of flexible material fastened to the top of the side bars and formed in a back, sides and bottom.

In testimony whereof, we have hereunto set our hands at Los Angeles, California, this 11th day of June, 1912.

CLARKE D. WATSON.
CLINTON D. HAYWARD.

In presence of—
JAMES R. TOWNSEND,
L. BELLE RICE.

Copies of this patent may be obtained for five cents each, by addressing the "Commissioner of Patents, Washington, D. C."